United States Patent Office
3,404,333
Patented Oct. 1, 1968

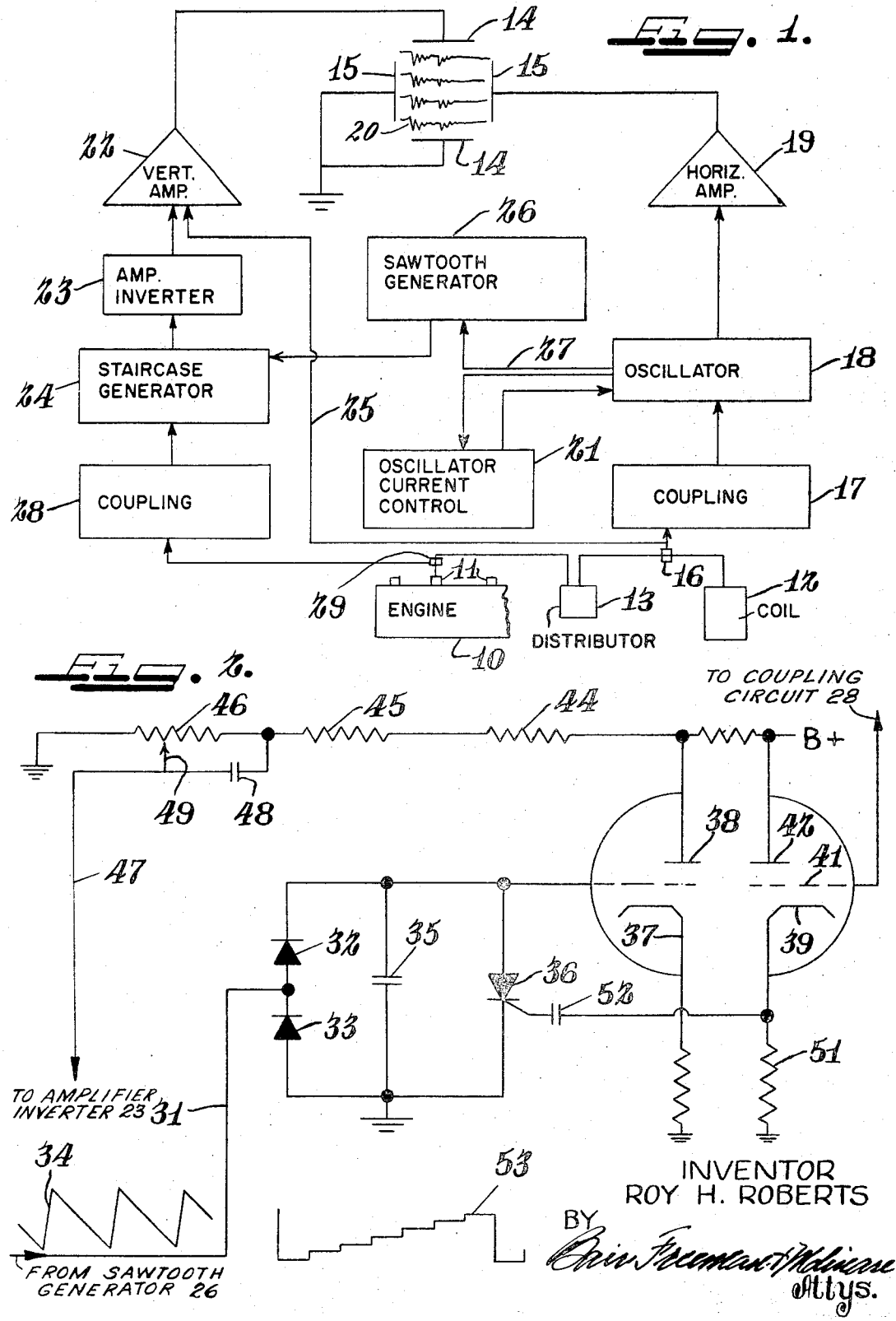

3,404,333
OSCILLOSCOPE RASTER DISPLAY CIRCUIT
Roy H. Roberts, Glenview, Ill., assignor to Sun Electric Corporation, a corporation of Delaware
Filed May 17, 1965, Ser. No. 456,405
1 Claim. (Cl. 324—15)

ABSTRACT OF THE DISCLOSURE

An improved oscilloscope raster display circuit for separately and simultaneously displaying on an oscilloscope screen a plurality of patterns indicative of the ignition characteristics of each of the cylinders of an internal combustion engine. The invention provides a substantial reduction in the cost and complexity of prior systems of this nature by applying the output of the horizontal sweep oscillator to a sawtooth wave generator to provide simultaneous and synchronous operation. The output of the sawtooth generator is applied to a staircase generator which provides a series of discrete steps in the vertical sweep waveform to display the individual cylinder patterns in a vertically spaced and simultaneous displayed raster.

---

This invention relates to an oscilloscope raster display circuit and more particularly to a circuit for separately and simultaneously displaying on the screen of a cathode ray oscilloscope a plurality of conditions existing in the operation of an internal combustion engine.

Oscilloscopes have been used for many years to indicate various functions of an internal combustion engine and particularly the characteristics and functioning of the ignition system. For this purpose signals derived from the coil or similar source of ignition voltage, or from the spark plugs are utilized to produce patterns on the oscilloscope screen indicating the firing characteristics of the ignition system. It has also been proposed to display separate traces, one for each cylinder of the engine, vertically displayed in a raster display on an oscilloscope screen so that the functioning of the several cylinders can be viewed simultaneously and compared. For example, the patent to Traver, No. 2,608,093, discloses and claims a system of this type.

Raster display circuits, as disclosed in the Traver patent, are relatively complicated and expensive and are further subject to the disadvantage that the oscilloscope patterns are displayed on slope rather than on horizontal lines so that they are difficult to read. It is, accordingly, one of the principal objects of the present invention to provide an oscilloscope raster display circuit which is relatively simple and which displays the patterns for different cylinders on vertically spaced horizontal lines.

Another object is to provide a raster display circuit in which the vertical sweep signal on the oscilloscope is varied in a series of discrete steps corresponding to functioning of different cylinders in a complete engine firing cycle to produce vertically displaced horizontal signal traces.

According to a feature of the invention, a capacitor is variably charged in discrete steps throughout a complete firing cycle to provide the varying vertical sweep signal and is discharged at the end of the complete cycle to return the circuit to its initial condition.

According to another feature of the invention, a sawtooth generator synchronized with operation of the engine is utilized to produce the varying charges on the capacitor and the capacitor is discharged at the end of a complete engine firing cycle and is responsive to a signal produced by firing of a selected one of the spark plugs.

The above and other objects and advantages of the invention will be more readily apparent from the following description when read in connection with the accompanying drawing, in which:

FIGURE 1 is a block diagram of a raster display circuit embodying the invention; and FIGURE 2 is a partial circuit diagram illustrating the means for producing and controlling the variable vertical sweep signal.

As indicated in the diagram of FIG. 1, the invention is adapted to be utilized with any conventional type of combustion engine indicated generally at 10, having a plurality of cylinders, each of which is provided with a spark plug 11. Firing voltage for the spark plugs may be supplied by a coil 12 or any other desired source of firing voltage which is made effective at predetermined intervals to fire a plug to which it is connected. Distributor 13 selectively and sequentially connects the coil to the different spark plugs in a firing cycle.

The circuit comprises an oscilloscope which is indicated diagrammatically as having vertical deflection plates 14 and horizontal deflection plates 15 to deflect the cathode ray beam thereof to produce visible traces on the screen of the oscilloscope in a known manner. According to the present invention, the horizontal deflection plates 15 receive a series of horizontal control voltages which will cause the trace to sweep horizontally, substantially the full width of the tube face as each cylinder fires and the vertical plates 14 will receive a variable voltage, which varies in discrete steps corresponding to the firing of each cylinder so that the traces indicative of the firing of the several cylinders will be superimposed in vertically spaced relation. This is illustrated, for example, by the traces 20 representative of the patterns displayed in the analysis of a four cylinder engine.

For controlling the horizontal sweep signal, a pickup 16, which may be a series connected transformer or simply a winding around the coil secondary output wire, is provided to pickup a signal from the coil or similar voltage source each time it supplies firing voltage to one of the spark plugs. This signal is fed into a coupling circuit 17 which, in turn, supplies it to a relaxation oscillator 18 which provides, through an amplifier 19, the horizontal sweep signal for the plates 15 of the oscilloscope. The oscillator 18 also supplies a signal to oscillator current control 21 which feeds a signal back into the oscillator and whose purpose is to maintain the horizontal sweep the same length regardless of variations in speed of the engine. A circuit of this general type is well known, for example, in the Traver patent mentioned above and will not be further described herein.

The present invention is primarily concerned with control of the voltage signal on the vertical plates 14. As shown, the vertical sweep voltage is supplied through an amplifier 22 from an amplifier inverter 23 which is in turn driven by a staircase generator 24 to provide a series of discrete voltage steps, one for each cylinder, in a complete cycle of the engine. The amplifier 22 also receives a signal from the pickup 16 through a connection 25 to vary the trace vertically as it sweeps horizontally across the tube screen thereby to indicate the character of the ignition circuit during firing of each of the cylinders.

The staircase generator receives input signals from a sawtooth wave generator 26 which is coupled to the oscillator 18 as indicated by the line 27 to function simultaneously with the oscillator. The output of the sawtooth generator is fed into the staircase generator as indicated to provide a series of discrete steps, one for each cylinder of the engine, in the vertical sweep signal thereby to space the signal traces for each of the cylinders vertically in progression.

Preferably, the signal for the number "one" cylinder is displayed at the top of the screen with the signals for the other cylinders in the firing order appearing sequentially below it, although this is not essential.

At the end of each complete firing cycle of the engine, the staircase generator is returned to its original condition to return the vertical trace, for example, to the top portion of the screen at the beginning of each complete firing cycle. Thus multiple traces for each of the cylinders will be superimposed during continuing operation of the engine so that they may be viewed over a substantial period of time. In order to return the staircase generator to its initial condition, it is connected through a coupling circuit 28 to a pickup 29 in the lead to a selected one of the engine spark plugs such, for example, as the number "one" spark plug. Each time this spark plug fires, a signal will be transmitted through the coupling circuit to the staircase generator to return it to its initial condition and thereby to return the trace to its starting position on the oscilloscope screen.

FIG. 2 illustrates specifically an embodiment of the staircase generator circuit and the amplifier inverter circuit according to the invention. As shown, the input signal from the sawtooth generator 26 is supplied through a line 31 to a point between a pair of rectifiers 32 and 33 which are poled in the same direction. One side of the rectifier 33 is connected to ground as shown so that negative portions of the sawtooth wave supplied through the lead 31 and which may have the form indicated at 34 will pass directly to ground and will not affect the circuit. A capacitor 35 is connected between the other side of rectifier 32 and ground so that it will be progressively charged in discrete steps by the positive portions of the sawtooth wave which passes the rectifier 32. The capacitor 35 is shunted by a silicon controlled rectifier 36 through which it discharges periodically.

The charge on the capacitor 35 is supplied to the control grid of one section of an amplifier tube to control flow of current between the cathode 37 of that section and the anode 38. The tube, as shown, includes a second section having a cathode 39 which may be common to the cathode 37, a control grid 41 and an anode 42. The anode 42 is connected directly to B+ and the anode 38 is connected to B+ through a resistor 43. The other side of resistor 43 is connected to ground or B— through three resistors, 44, 45 and 46, in series. A line 47 leading to the amplifier inverter 23 is connected through a capacitor 48 to the common point between resistors 45 and 46 and a wiper 49 is connected to the line 47 and is movable over the resistor 46 to adjust the strength of the signal supplied to the amplifier inverter. The amplifier inverter is used so that as the signal voltage on line 47 increases during an engine cycle, the voltage applied to the vertical plates 14 will decrease and will cause subsequent horizontal sweeps to be displayed downwardly from the top rather than upwardly from the bottom. The cathode 39 of the right hand section of the tube is connected to ground through a load resistor 51 and the common point between the cathode and the load resistor is connected through a coupling capacitor 52 to the control element of the silicon control rectifier 36. Therefore, each time the selected spark plug fires, the right hand section of the amplifier tube will conduct and will supply a triggering signal to the silicon control rectifier 36 to trigger it into conduction thereby to discharge the capacitor 35.

The control grid 41 of the right hand section of the amplifier tube is coupled to the circuit 28 to receive a signal therefrom triggering the right hand side of the tube into conduction each time the selected one of the spark plugs fires.

In operation of the circuit, the capacitor 35 will normally be discharged or will have a predetermined relatively small charge so that the left hand section of the amplifier tube will have a relatively low level of conduction. When a sawtooth wave is received over the line 31, the positive portion of the wave will pass through the rectifier 32 to increase the charge on the capacitor 35 in a relatively sharp step. The negative portion of the sawtooth wave will be by-passed to ground through the rectifier 33 so that the capacitor will hold its charge until the next sawtooth wave is received to increase the charge again in a sharp increment. Each time the charge on the capacitor 35 is increased, the signal voltage on the control grid of the left hand section of the amplifier tube will be increased to increase the signal voltage supply through the line 47 to the amplifier inverter 23 and amplifier 22 to the vertical deflection plates 14. Thus, the vertical deflection signal will vary in a series of discrete steps as indicated by the curve 53 shown beneath the staircase generator in FIG. 2. Each step, because of synchronization of the sawtooth generator with the horizontal oscillator 18, will respond to the firing of a single cylinder so that the traces indicative of the firing characteristics of the different cylinders will be displayed in accurate alignment with each other in vertically spaced generally horizontal traces.

At the end of a complete firing cycle, when the spark plug 11 to which the pickup 29 is connected fires, the right hand section of the amplifier tube will conduct to make the silicon rectifier 36 conductive thereby rapidly to discharge the capacitor 35 and return the vertical sweep signal to its initial or starting condition. The pattern may therefore be repeated rapidly and accurately over any desired number of firing cycles so that ample time may be provided to compare the firing characteristics of the different cylinders and to determine any irregularities in functioning of the engine.

While one embodiment of the invention has been shown and described in detail, it will be understood that this is illustrative only and is not to be taken as a definition of the scope of the invention or reference being had to this purpose to the appended claim.

I claim:

1. An oscilloscope raster display circuit for separately and simultaneously displaying on an oscilloscope screen a vertically stacked array of patterns indicative of the ignition characteristics of each of the cylinders in an operating internal combustion engine having a spark plug for each cylinder, a periodically effective source of firing voltage for said spark plugs, and a distributor connecting said spark plugs selectively to the source, said circuit comprising:

(a) means for producing a horizontal sweep signal on said oscilloscope for each of said patterns, (b) a connection from said means to said periodically effective source of firing voltage to synchronize the horizontal sweep signal with the functioning of said source, (c) a staircase signal generator having a discretely chargeable capacitor for producing a stepped waveform vertical sweep signal for said oscilloscope to separate the horizontal sweeps into a vertically stacked array of patterns, (d) sawtooth generating means connecting the horizontal sweep signal producing means to said staircase signal generator to synchronize the horizontal and vertical sweep operations on said oscilloscope, said sawtooth generating means serving to vary the charge on said capacitor in discrete steps to produce said stepped waveform vertical sweep signal, (e) vertical amplifier means connecting the stepped waveform signal output of the staircase signal generator to the vertical deflection plates of said oscilloscope, (f) a connection from said periodically effective source of firing voltage to said vertical amplifier means to vary each oscilloscope sweep pattern vertically on oscilloscope screen to indicate the ignition characteristics of each cylinder during the firing thereof,
(g) a normally non-conducting silicon controlled rectifier connected across said capacitor, and
(h) means responsive to the firing of a selected one of said spark plugs to trigger said silicon controlled rectifier into conduction and discharge the capacitor to return the oscilloscope horizontal sweep into its initial position.

References Cited

UNITED STATES PATENTS

| | | | |
|---|---|---|---|
| 2,608,093 | 8/1952 | Traver | 324—16 |
| 3,035,438 | 5/1962 | Hale | 324—15 |

RUDOLPH V. ROLINEC, *Primary Examiner.*

M. J. LYNCH, *Assistant Examiner.*